US012676338B2

(12) United States Patent
Mizuno et al.

(10) Patent No.: US 12,676,338 B2
(45) Date of Patent: Jul. 7, 2026

(54) SOLID ELECTROLYTE MATERIAL, BATTERY USING SAME, AND METHOD FOR PRODUCING SOLID ELECTROLYTE MATERIAL

(71) Applicant: Panasonic Intellectual Property Management Co., Ltd., Osaka (JP)

(72) Inventors: Keita Mizuno, Osaka (JP); Takashi Kubo, Hyogo (JP); Masashi Sakaida, Hyogo (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 714 days.

(21) Appl. No.: 17/956,379

(22) Filed: Sep. 29, 2022

(65) Prior Publication Data

US 2023/0040104 A1     Feb. 9, 2023

Related U.S. Application Data

(63) Continuation of application No. PCT/JP2021/004428, filed on Feb. 5, 2021.

(30) Foreign Application Priority Data

Mar. 31, 2020     (JP) ................................. 2020-064805

(51) Int. Cl.
*H01M 10/0562* (2010.01)
*C01F 17/36* (2020.01)
*H01M 10/0525* (2010.01)

(52) U.S. Cl.
CPC ......... *H01M 10/0562* (2013.01); *C01F 17/36* (2020.01); *H01M 10/0525* (2013.01);
(Continued)

(58) Field of Classification Search
CPC ........... H01M 10/052; H01M 10/0562; H01M 10/0525; H01M 2300/008; H01M 6/18; C01F 17/36; C01P 2002/72; Y02E 60/10
See application file for complete search history.

(56) References Cited

U.S. PATENT DOCUMENTS

2006/0051278 A1     3/2006   Hong et al.
2009/0050918 A1     2/2009   Zhuang et al.
(Continued)

FOREIGN PATENT DOCUMENTS

JP     2007-531682 A     11/2007
JP     2011-129312 A     6/2011
(Continued)

OTHER PUBLICATIONS

International Search Report issued on Mar. 2, 2021 in International Patent Application No. PCT/JP2021/004428, with English translation.

(Continued)

*Primary Examiner* — Aiqun Li
(74) *Attorney, Agent, or Firm* — WHDA, LLP

(57) ABSTRACT

A solid electrolyte material according to the present disclosure includes Li, DC, Y, Sm, and X. The DC is at least one selected from the group consisting of Mg, Ca, Sr, Ba, and Zn. The X is at least one selected from the group consisting of F, Cl, Br, and I. A battery according to the present disclosure includes a positive electrode, a negative electrode, and an electrolyte layer provided between the positive electrode and the negative electrode. At least one selected from the group consisting of the positive electrode, the negative electrode, and the electrolyte layer includes the solid electrolyte material according to the present disclosure.

14 Claims, 9 Drawing Sheets

(52) U.S. Cl.
CPC ...... *C01P 2002/50* (2013.01); *C01P 2002/72* (2013.01); *C01P 2006/40* (2013.01); *H01M 2300/008* (2013.01)

(56) References Cited

U.S. PATENT DOCUMENTS

| | | | |
|---|---|---|---|
| 2012/0301796 A1 | 11/2012 | Ohtomo et al. | |
| 2017/0170515 A1* | 6/2017 | Yushin ................. | H01M 4/582 |
| 2019/0088995 A1 | 3/2019 | Asano et al. | |
| 2019/0140265 A1* | 5/2019 | Miara .................... | C01B 25/45 |
| 2020/0328460 A1 | 10/2020 | Asano et al. | |

FOREIGN PATENT DOCUMENTS

| | | |
|---|---|---|
| WO | 2018/025582 A1 | 2/2018 |
| WO | 2019/135343 A1 | 7/2019 |

OTHER PUBLICATIONS

Extended European Search Report issued on the corresponding European Patent Application No. 21779961.8, dated Aug. 22, 2023.

* cited by examiner

SOLID ELECTROLYTE MATERIAL, BATTERY USING SAME, AND METHOD FOR PRODUCING SOLID ELECTROLYTE MATERIAL

This application is a continuation of PCT/JP2021/004428 filed on Feb. 5, 2021, which claims foreign priority of Japanese Patent Application No. 2020-064805 filed on Mar. 31, 2020, the entire contents of both of which are incorporated herein by reference.

BACKGROUND OF THE INVENTION

1. Field of the Invention

The present disclosure relates to a solid electrolyte material, a battery using the same, and a method of manufacturing a solid electrolyte material.

2. Description of Related Art

JP 2011-129312 A discloses an all-solid-state battery using a sulfide solid electrolyte.

WO 2018/025582 A1 discloses a solid electrolyte material represented by a composition formula $Li_{6-3z}Y_zX_6$ ($0<z<2$, $X=Cl$ or Br).

SUMMARY OF THE INVENTION

The present disclosure aims to provide a novel solid electrolyte material having high utility.

A solid electrolyte material of the present disclosure includes:

Li;

DC;

Y;

Sm; and

X, wherein the DC is at least one selected from the group consisting of Mg, Ca, Sr, Ba, and Zn, and the X is at least one selected from the group consisting of F, Cl, Br, and I.

The present disclosure provides a novel solid electrolyte material having high utility.

DETAILED DESCRIPTION

Figure 1:
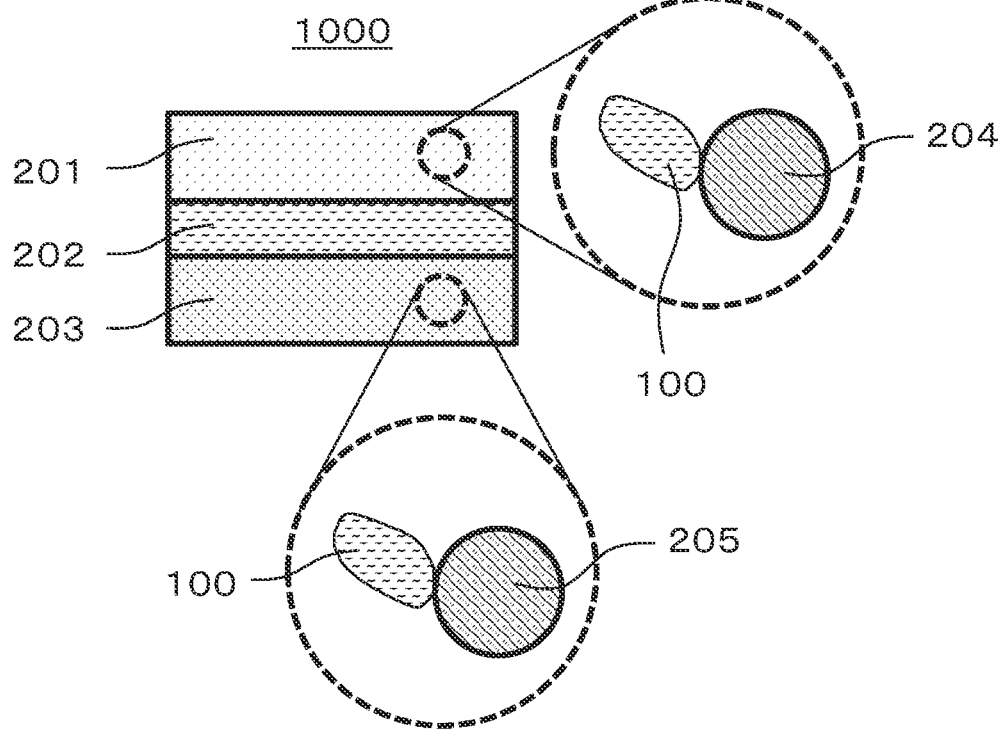
FIG. 1 shows a cross-sectional view of a battery 1000 according to a second embodiment.

Embodiments of the present disclosure will be described below with reference to the drawings. The present disclosure is not limited to the following embodiments.

First Embodiment

A solid electrolyte material according to a first embodiment includes Li, DC, Y, Sm, and X. DC is at least one selected from the group consisting of Mg, Ca, Sr, Ba, and Zn. X is at least one selected from the group consisting of F, Cl, Br, and I.

The solid electrolyte material according to the first embodiment can have, for example, practical lithium-ion conductivity, and can have, for example, high lithium-ion conductivity. Here, high lithium-ion conductivity is, for example, $1\times10^{-5}$ S/cm or more near room temperature. In other words, the solid electrolyte material according to the first embodiment can have an ionic conductivity of, for example, $1\times10^{-5}$ S/cm or more.

The solid electrolyte material according to the first embodiment can be used to achieve a battery having excellent charge and discharge characteristics. An example of the battery is an all-solid-state battery. The all-solid-state battery may be a primary battery or a secondary battery.

It is desirable that the solid electrolyte material according to the first embodiment should be substantially free of sulfur. The phrase "the solid electrolyte material according to the first embodiment is substantially free of sulfur" means that the solid electrolyte material does not contain sulfur as a constituent element except sulfur inevitably introduced as impurities. In this case, sulfur introduced as impurities into the solid electrolyte material has an amount of, for example, 1 mol % or less. It is further desirable that the solid electrolyte material according to the first embodiment should be free of sulfur. Solid electrolyte materials free of sulfur generate no hydrogen sulfide when exposed to the atmosphere, and accordingly are excellent in safety. The sulfide solid electrolyte disclosed in JP 2011-129312 A might generate hydrogen sulfide when exposed to the atmosphere.

To increase the ionic conductivity of a solid electrolyte material, the solid electrolyte material according to the first embodiment may consist substantially of Li, DC, Y, Sm, and X. Here, the phrase "the solid electrolyte material according to the first embodiment consists substantially of Li, DC, Y, Sm, and X" means that the ratio (i.e., mole fraction) of the sum of amounts of substance of Li, DC, Y, Sm, and X to the total of amounts of substance of all the elements constituting the solid electrolyte material according to the first embodiment is 90% or more. In an example, the ratio may be 95% or more. The solid electrolyte material according to the first embodiment may consist of Li, DC, Y, Sm, and X.

The solid electrolyte material according to the first embodiment may contain an element which is inevitably introduced. Examples of the element include hydrogen, oxygen, and nitrogen. Such an element may be present in a raw material powder of the solid electrolyte material or in an atmosphere for manufacturing or storing the solid electrolyte material.

To increase the ionic conductivity of the solid electrolyte material, X may be at least one selected from the group consisting of Cl and Br.

To increase the ionic conductivity of the solid electrolyte material, DC may be Ca.

The solid electrolyte material according to the first embodiment may be a material represented by the following composition formula (1), $$\text{Li}_{3-2a-3d}\text{DC}_a\text{Y}_{1-b}\text{Sm}_{b+d}\text{Br}_{6-c}\text{Cl}_c \qquad (1)$$

where the following four mathematical relations are satisfied:

$0 < a \le 0.25$;

$0 < b < 1$;

$0 \le c \le 6$; and $0 \le d \le 0.05$.

The material represented by the composition formula (1) has high ionic conductivity.

To increase the ionic conductivity of the solid electrolyte material, a mathematical relation $0.01 \le a \le 0.15$ may be satisfied in the composition formula (1).

To increase the ionic conductivity of the solid electrolyte material, a mathematical relation $0.01 \le b \le 0.5$ may be satisfied in the composition formula (1).

To increase the ionic conductivity of the solid electrolyte material, a mathematical relation $1.5 \le c \le 2.5$ may be satisfied in the composition formula (1).

The upper and lower limits for the range of a in the composition formula (1) may be defined by any combination of numerical values selected from numerical values greater than 0 (i.e., $0 < a$) and numerical values 0.01, 0.1, 0.15, 0.125, 0.15, and 0.25.

The upper and lower limits for the range of b in the composition formula (1) may be defined by any combination of numerical values selected from numerical values greater than 0 and numerical values 0.01, 0.1, 0.15, 0.2, 0.3, 0.5, 0.7, 0.9, and less than 1 (i.e., $b < 1$).

The upper and lower limits for the range of c in the composition formula (1) may be defined by any combination of numerical values selected from numerical values 0, 1.5, 2.5, 3, 3.5, 4, 4.5, 5, and 6.

An X-ray diffraction pattern of the solid electrolyte material according to the first embodiment can be obtained by X-ray diffraction measurement according to the θ-2θ method using Cu-Kα rays (wavelengths of 1.5405 Å and 1.5444 Å, i.e., wavelengths of 0.15405 nm and 0.15444 nm). In the obtained X-ray diffraction pattern, at least one peak may be present within a range of a diffraction angle 2θ from 29.0° to 32.0°, and at least two peaks may be present within a range of the diffraction angle 2θ from 14.0° to 18.0°. A crystalline phase having such a peak is referred to as first crystalline phase. A solid electrolyte material including the first crystalline phase has high ionic conductivity. The solid electrolyte material including the first crystalline phase facilitates formation of a path for lithium ions to diffuse. This further improves the ionic conductivity.

The first crystalline phase belongs to the trigonal system. Crystalline phases belonging to the trigonal system have a crystal structure similar to that of $\text{Li}_3\text{ErCl}_6$ disclosed in the Inorganic Crystal Structure Database (ICSD), Collection Code 50151, and have an X-ray diffraction pattern specific to this structure.

In the X-ray diffraction pattern obtained by the X-ray diffraction measurement using a Cu-Kα ray, at least two peaks may be present within a range of the diffraction angle 2θ from 24.0° to 35.0°, and at least one peak may be present within a range of the diffraction angle 2θ from 12.0° to 16.0°. A crystalline phase having such a peak is referred to as second crystalline phase. A solid electrolyte material including the second crystalline phase has high ionic conductivity. The solid electrolyte material including the second crystalline phase facilitates formation of a path for lithium ions to diffuse. This further improves the ionic conductivity. In the above X-ray diffraction pattern of the second crystalline phase, at least two peaks may be present within a range of the diffraction angle 2θ from 26.0° to 35.0°, and at least one peak may be present within a range of the diffraction angle 2θ from 13.7° to 16.0°. Such a solid electrolyte material has higher ionic conductivity. The solid electrolyte material including the crystalline phase having the above peaks further facilitates formation of a path for lithium ions to diffuse. This further improves the ionic conductivity.

The second crystalline phase belongs to the monoclinic system. Crystalline phases belonging to the monoclinic system have a crystal structure similar to that of $\text{Li}_3\text{ErBr}_6$ disclosed in the Inorganic Crystal Structure Database (ICSD), Collection Code 50182, and have an X-ray diffraction pattern specific to this structure.

The solid electrolyte material according to the first embodiment may further include a third crystalline phase that is different from the first crystalline phase and different from the second crystalline phase. In other words, the solid electrolyte material according to the first embodiment may further include the third crystalline phase whose peak is present outside the ranges of the diffraction angle 2θ described above. The third crystalline phase may be interposed between the first crystalline phase and the second crystalline phase.

The solid electrolyte material according to the first embodiment may be crystalline or amorphous.

The shape of the solid electrolyte material according to the first embodiment is not limited. The shape is, for example, acicular, spherical, or ellipsoidal. The solid electrolyte material according to the first embodiment may be in particle form. The solid electrolyte material according to the first embodiment may be formed in the shape of a pellet or a plate.

In the case where the shape of the solid electrolyte material according to the first embodiment is, for example, in particle form (e.g., spherical), the solid electrolyte material may have a median diameter of 0.1 μm or more and 100 μm or less. The median diameter means the particle diameter at a cumulative volume equal to 50% in the volumetric particle size distribution. The volumetric particle size distribution is measured, for example, by a laser diffraction measurement device or an image analysis device.

The solid electrolyte material according to the first embodiment may have a median diameter of 0.5 μm or more and 10 μm or less. Accordingly, the solid electrolyte material according to the first embodiment has higher ionic conductivity. Furthermore, in the case where the solid electrolyte material according to the first embodiment is mixed with another material such as an active material, a favorable dispersion state of the solid electrolyte material according to the first embodiment and the other material is achieved.

Second Embodiment

A second embodiment will be described below. The matters described in the first embodiment can be omitted.

A battery according to the second embodiment includes a positive electrode, a negative electrode, and an electrolyte layer. The electrolyte layer is provided between the positive electrode and the negative electrode. At least one selected from the group consisting of the positive electrode, the electrolyte layer, and the negative electrode includes the solid electrolyte material according to the first embodiment.

Owing to including the solid electrolyte material according to the first embodiment, the battery according to the second embodiment has excellent charge and discharge characteristics. The battery may be an all-solid-state battery.

FIG. 1 shows a cross-sectional view of a battery 1000 according to the second embodiment.

The battery 1000 according to the second embodiment includes a positive electrode 201, an electrolyte layer 202, and a negative electrode 203. The electrolyte layer 202 is provided between the positive electrode 201 and the negative electrode 203.

The positive electrode 201 includes positive electrode active material particles 204 and solid electrolyte particles 100.

The electrolyte layer 202 includes an electrolyte material. The electrolyte material is, for example, a solid electrolyte material.

The negative electrode 203 includes negative electrode active material particles 205 and the solid electrolyte particles 100.

The solid electrolyte particles 100 are particles consisting of the solid electrolyte material according to the first embodiment or particles including the solid electrolyte material according to the first embodiment as the main component. Here, the particles including the solid electrolyte material according to the first embodiment as the main component refer to particles in which the component present in the largest amount in molar ratio is the solid electrolyte material according to the first embodiment.

The positive electrode 201 includes a material capable of occluding and releasing metal ions (e.g., lithium ions). The material is, for example, a positive electrode active material (e.g., the positive electrode active material particles 204).

Examples of the positive electrode active material include a lithium-containing transition metal oxide, a transition metal fluoride, a polyanion material, a fluorinated polyanion material, a transition metal sulfide, a transition metal oxyfluoride, a transition metal oxysulfide, and a transition metal oxynitride. Examples of the lithium-containing transition metal oxide include $Li(Ni, Co, Al)O_2$ and $LiCoO_2$. In the present disclosure, the expression "(Ni, Co, Al)" in the chemical formula represents at least one selected from the group of elements in parentheses. In other words, "(Ni, Co, Al)" refers to "at least one selected from the group consisting of Ni, Co, and Al". The same applies to other elements.

The positive electrode active material particles 204 may have a median diameter of 0.1 μm or more and 100 μm or less. In the case where the positive electrode active material particles 204 have a median diameter of 0.1 μm or more, a favorable dispersion state of the positive electrode active material particles 204 and the solid electrolyte particles 100 is achieved in the positive electrode 201. This improves the charge and discharge characteristics of the battery. In the case where the positive electrode active material particles 204 have a median diameter of 100 μm or less, the diffusion rate of lithium in the positive electrode active material particles 204 improves. This enables the battery to operate at a high power.

The positive electrode active material particles 204 may have a median diameter larger than the solid electrolyte particles 100. This achieves a favorable dispersion state of the positive electrode active material particles 204 and the solid electrolyte particles 100 in the positive electrode 201.

From the viewpoint of energy density and power output of the battery, in the positive electrode 201, the ratio of the volume of the positive electrode active material particles 204 to the sum of the volume of the positive electrode active material particles 204 and the volume of the solid electrolyte particles 100 may be 0.30 or more and 0.95 or less.

From the viewpoint of energy density and power output of the battery, the positive electrode 201 may have a thickness of 10 μm or more and 500 μm or less.

The electrolyte layer 202 includes an electrolyte material. The electrolyte material is, for example, the solid electrolyte material according to the first embodiment. The electrolyte layer 202 may be a solid electrolyte layer.

The electrolyte layer 202 may consist of the solid electrolyte material according to the first embodiment. Alternatively, the electrolyte layer 202 may consist of a solid electrolyte material different from the solid electrolyte material according to the first embodiment.

Examples of the solid electrolyte material different from the solid electrolyte material according to the first embodiment include $Li_2MgX'_4$, $Li_2FeX'_4$, $Li(Al, Ga, In)X'_4$, $Li_3(Al, Ga, In)X'_6$, and $LiI$ where X' is at least one selected from the group consisting of F, Cl, Br, and I.

Hereinafter, the solid electrolyte material according to the first embodiment is referred to as first solid electrolyte material. The solid electrolyte material different from the solid electrolyte material according to the first embodiment is referred to as second solid electrolyte material.

The electrolyte layer 202 may include not only the first solid electrolyte material but also the second solid electrolyte material. In the electrolyte layer 202, the first solid electrolyte material and the second solid electrolyte material may be homogenously dispersed. A layer formed of the first solid electrolyte material and a layer formed of the second solid electrolyte material may be stacked along the stacking direction of the battery 1000.

The electrolyte layer 202 may have a thickness of 1 μm or more and 1000 μm or less. In the case where the electrolyte layer 202 has a thickness of 1 μm or more, a short-circuit between the positive electrode 201 and the negative electrode 203 is less likely to occur. In the case where the electrolyte layer 202 has a thickness of 1000 μm or less, the battery can operate at a high power.

The negative electrode 203 includes a material capable of occluding and releasing metal ions such as lithium ions. The material is, for example, a negative electrode active material (e.g., the negative electrode active material particles 205).

Examples of the negative electrode active material include a metal material, a carbon material, an oxide, a nitride, a tin compound, and a silicon compound. The metal material may be an elemental metal or an alloy. Examples of the metal material include lithium metal and a lithium alloy. Examples of the carbon material include natural graphite, coke, semi-graphitized carbon, a carbon fiber, spherical carbon, artificial graphite, and amorphous carbon. From the viewpoint of capacity density, preferred examples of the negative electrode active material include silicon (i.e., Si), tin (i.e., Sn), a silicon compound, and a tin compound.

The negative electrode active material particles 205 may have a median diameter of 0.1 μm or more and 100 μm or less. In the case where the negative electrode active material particles 205 have a median diameter of 0.1 μm or more, a favorable dispersion state of the negative electrode active material particles 205 and the solid electrolyte particles 100 is achieved in the negative electrode 203. This improves the charge and discharge characteristics of the battery. In the case where the negative electrode active material particles 205 have a median diameter of 100 μm or less, the diffusion rate of lithium in the negative electrode active material particles 205 improves. This enables the battery to operate at a high power.

The negative electrode active material particles 205 may have a median diameter larger than the solid electrolyte particles 100. This achieves a favorable dispersion state of the negative electrode active material particles 205 and the solid electrolyte particles 100 in the negative electrode 203.

From the viewpoint of energy density and power output of the battery, in the negative electrode 203, the ratio of the volume of the negative electrode active material particles 205 to the sum of the volume of the negative electrode active material particles 205 and the volume of the solid electrolyte particles 100 may be 0.30 or more and 0.95 or less.

From the viewpoint of energy density and power output, the negative electrode 203 may have a thickness of 10 μm or more and 500 μm or less.

To increase the ionic conductivity, the chemical stability, and the electrochemical stability, at least one selected from the group consisting of the positive electrode 201, the electrolyte layer 202, and the negative electrode 203 may include the second solid electrolyte material.

As described above, the second solid electrolyte material may be a halide solid electrolyte.

Examples of the halide solid electrolyte include $Li_2MgX'_4$, $Li_2FeX'_4$, $Li(Al, Ga, In)X'_4$, $Li_3(Al, Ga, In)X'_6$, and LiI where X is at least one selected from the group consisting of F, Cl, Br, and I.

The second solid electrolyte material may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte include:

(i) a NASICON solid electrolyte such as $LiTi_2(PO_4)_3$ and element-substituted substances thereof;

(ii) a perovskite solid electrolyte such as $(LaLi)TiO_3$;

(iii) a LISICON solid electrolyte such as $Li_{14}ZnGe_4O_{16}$, $Li_4SiO_4$, and $LiGeO_4$ and element-substituted substances thereof;

(iv) a garnet solid electrolyte such as $Li_7La_3Zr_2O_{12}$ and element-substituted substances thereof; and (v) $Li_3PO_4$ and N-substituted substances thereof.

The second solid electrolyte material may be an organic polymer solid electrolyte.

An example of the organic polymer solid electrolyte is a compound of a polymer compound and a lithium salt. The polymer compound may have an ethylene oxide structure. A polymer compound having an ethylene oxide structure can contain a large amount of a lithium salt, and accordingly can further increase the ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate transfer of lithium ions and thereby improve the output characteristics of the battery, at least one selected from the group consisting of the positive electrode 201, the electrolyte layer 202, and the negative electrode 203 may include a nonaqueous electrolyte solution, a gel electrolyte, or an ionic liquid.

The nonaqueous electrolyte solution contains a nonaqueous solvent and a lithium salt dissolved in the nonaqueous solvent.

Examples of the nonaqueous solvent include a cyclic carbonate solvent, a linear carbonate solvent, a cyclic ether solvent, a linear ether solvent, a cyclic ester solvent, a linear ester solvent, and a fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoroethyl methyl carbonate, and fluorodimethylene carbonate. One nonaqueous solvent selected from these may be used alone. Alternatively, a mixture of two or more nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used. The concentration of the lithium salt is, for example, 0.5 mol/L or more and 2 mol/L or less.

As the gel electrolyte, a polymer material impregnated with a nonaqueous electrolyte solution can be used. Examples of the polymer material include polyethylene oxide, polyacrylonitrile, polyvinylidene fluoride, polymethyl methacrylate, and a polymer having an ethylene oxide bond.

Examples of cations contained in the ionic liquid include:

(i) aliphatic linear quaternary salts such as tetraalkylammoniums and tetraalkylphosphoniums;

(ii) aliphatic cyclic ammoniums such as pyrrolidiniums, morpholiniums, imidazoliniums, tetrahydropyrimidiniums, piperaziniums, and piperidiniums; and (iii) nitrogen-containing heterocyclic aromatic cations such as pyridiniums and imidazoliums.

Examples of anions contained in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

To increase the adhesion between particles, at least one selected from the group consisting of the positive electrode 201, the electrolyte layer 202, and the negative electrode 203 may contain a binder.

Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. A copolymer can also be used as the binder. Examples of such a binder include a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may be used as the binder.

To increase the electronic conductivity, at least one selected from the positive electrode 201 and the negative electrode 203 may contain a conductive additive.

Examples of the conductive additive include:
(i) graphites such as natural graphite and artificial graphite;
(ii) carbon blacks such as acetylene black and ketjen black;
(iii) conductive fibers such as a carbon fiber and metal fiber;
(iv) fluorinated carbon;
(v) metal powders such as an aluminum powder;
(vi) conductive whiskers such as a zinc oxide whisker and a potassium titanate whisker;
(vii) a conductive metal oxide such as titanium oxide; and
(viii) a conductive polymer compound such as polyaniline compound, polypyrrole compound, and polythiophene compound. To reduce the cost, the conductive additive in (i) or (ii) above may be used.

Examples of the shape of the battery according to the second embodiment include a coin type, a cylindrical type, a prismatic type, a sheet type, a button type, a flat type, and a stack type.

The battery according to the second embodiment may be manufactured, for example, by preparing a material for forming a positive electrode, a material for forming an electrolyte layer, and a material for forming a negative electrode, and producing by a known method a stack in which the positive electrode, the electrolyte layer, and the negative electrode are disposed in this order.

Third Embodiment

A third embodiment will be described below. The matters described in the first and second embodiments may be omitted as appropriate.

Figure 2:
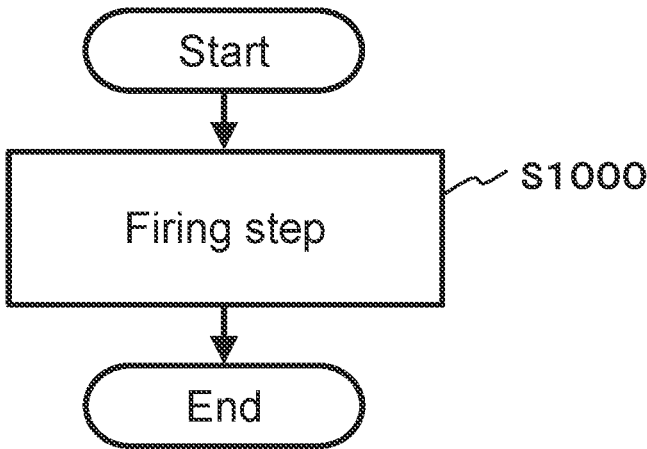
FIG. 2 is a flowchart showing an example of a manufacturing method according to a third embodiment.

FIG. 2 is a flowchart showing an example of a manufacturing method according to the third embodiment.

The manufacturing method according to the third embodiment includes a firing step S1000. In the firing step S1000, a mixed material is fired in an inert gas atmosphere.

The mixed material to be fired in the firing step S1000 includes a halide including Li, a halide including Y, a halide including Sm, and a halide including DC. Here, DC is at least one selected from the group consisting of Mg, Ca, Sr, and Ba.

By the manufacturing method according to the third embodiment, it is possible to manufacture the solid electrolyte material according to the first embodiment. The manufacturing method according to the third embodiment is an industrially productive method. The industrially productive method is, for example, a method enabling low-cost mass production. In other words, in the manufacturing method according to the third embodiment, it is possible to manufacture a solid electrolyte material including Li, DC, Y, and Sm by a simple manufacturing method, that is, by firing in an inert gas atmosphere, without using a vacuum sealed tube and a planetary ball mill.

In the firing step S1000, the powder of the mixed material may be put in a container (e.g., a crucible) and fired in a heating furnace.

The mixed material may be fired at 200° C. or more and 650° C. or less. Owing to this, a solid electrolyte material can be manufactured by a productive method. Setting the firing temperature to 200° C. or more enables a sufficient reaction of the mixed material. Setting the firing temperature to 650° C. or less can suppress composition deviation due to thermal decomposition of a solid electrolyte material generated using the mixed material and a solid phase reaction.

To manufacture a solid electrolyte material having higher ionic conductivity by an industrially productive method, the mixed material may be fired at 400° C. or more and 650° C. or less. Setting the firing temperature to 400° C. or more enables a sufficient reaction of the mixed material.

To manufacture a solid electrolyte material having higher ionic conductivity by an industrially productive method, the mixed material may be fired at 450° C. or more (e.g., 450° C. or more and 650° C. or less). Owing to this, a fired product (i.e., the generated solid electrolyte material) has higher crystallinity. As a result, the ionic conductivity of a solid electrolyte material thus manufactured can be further increased. In other words, a solid electrolyte material of higher quality can be obtained.

To manufacture a solid electrolyte material having higher ionic conductivity by an industrially productive method, the mixed material may be fired at 550° C. or less (e.g., 400° C. or more and 550° C. or less, or 450° C. or more and 550° C. or less). The temperature of 550° C. or less is a temperature equal to or less than the melting point of a halide such as LiBr and LiI. Therefore, setting the firing temperature to 550° C. or less can suppress composition deviation of the fired product caused, for example, by volatilization of a halide. As a result, a decrease in ionic conductivity of the fired product (i.e., the generated solid electrolyte material) can be suppressed. In other words, a solid electrolyte material of high quality can be obtained.

The mixed material may be fired for 1 minute or more and 9000 minutes or less. Owing to this, a solid electrolyte material can be manufactured by an industrially productive method.

In the case where the firing temperature is 400° C. or more, the mixed material may be fired for 1 minute or more and 3600 minutes or less. Owing to this, a solid electrolyte material can be manufactured by an industrially productive method. Setting the firing time to 1 minute or more enables a sufficient reaction of the mixed material. Setting the firing time to 3600 minutes or less can suppress volatilization of the fired product. In other words, a solid electrolyte material having a target composition ratio or a composition close to a target one can be obtained. As a result, a decrease in ionic conductivity of the solid electrolyte material caused by composition deviation can be suppressed. In other words, a solid electrolyte material of higher quality can be obtained.

To manufacture a solid electrolyte material having higher ionic conductivity by an industrially productive method, the mixed material may be fired for 180 minutes or less (e.g., 1 minute or more and 180 minutes or less). Setting the firing time to 180 minutes or less can further suppress volatilization of the solid electrolyte material which is a fired product. As a result, a solid electrolyte material having a target composition ratio or a composition close to a target one can be obtained (i.e., composition deviation can be further suppressed). Owing to these, a decrease in ionic conductivity of the fired product (i.e., the generated solid electrolyte material) can be suppressed. In other words, a solid electrolyte material of higher quality can be obtained.

As the inert gas, for example, helium, nitrogen, or argon can be used.

After the firing step S1000, the fired product may be taken out from the container (e.g., a crucible) and pulverized. In this case, a pulverizing tool (e.g., a mortar or a mixer) may be used.

The mixed material may be a material in which $Li\alpha$, $Y\beta_3$, $Sm\gamma_3$, and $DC\delta_2$ are mixed. Here, $\alpha$, $\beta$, $\gamma$, and $\delta$ are each independently at least one selected from the group consisting of F, Cl, Br, and I. Owing to this, a solid electrolyte material including Li, DC, Y, and Sm can be manufactured simply.

Li$\alpha$, Y$\beta_3$, Sm$\gamma_3$, and DC$\delta_2$ may be mixed at a molar ratio of, for example, LiBr:LiCl:DCCl$_2$:YCl$_3$:SmCl$_3$=2:0.8:0.1: 0.8:0.2. Thus, a solid electrolyte material having a composition represented by Li$_{2.8}$Ca$_{0.1}$Y$_{0.8}$Sm$_{0.2}$Br$_2$Cl$_4$ can be manufactured.

The mixed material may be a material in which not only Li$\alpha$, Y$\beta_3$, Sm$\gamma_3$, and DC$\delta_2$ but also a material different from Li$\alpha$, Y$\beta_3$, Sm$\gamma_3$, and DC$\delta_2$ is further mixed.

Furthermore, the mixed material may be a material in which M$_e$X$_f$ is mixed. Here, M is at least one selected from the group consisting of Na, K, In, Sn, Bi, La, Ce, Pr, Nd, Pm, Gd, Eu, Tb, Dy, Ho, Er, Tm, Yb, and Lu. X is at least one selected from the group consisting of F, Cl, Br, and I. Mathematical relations e>0 and f>0 are satisfied. Owing to this, a solid electrolyte material thus manufactured can have improved characteristics (e.g., ionic conductivity).

In M$_e$X$_f$ described above, e=1 and 1≤f≤5 may be satisfied. Here, $\alpha$, $\beta$, $\gamma$, and $\delta$ each may be independently at least one selected from the group consisting of Cl and Br. Owing to this, a solid electrolyte material thus manufactured can have further improved characteristics (e.g., ionic conductivity).

In at least one selected from the group consisting of Li$\alpha$, Y$\beta_3$, Sm$\gamma_3$, and DC$\delta_2$ contained in the mixed material, cations (i.e., Li, Y, Sm, and DC) may be partially substituted by another cation (e.g., M described above).

Figure 3:
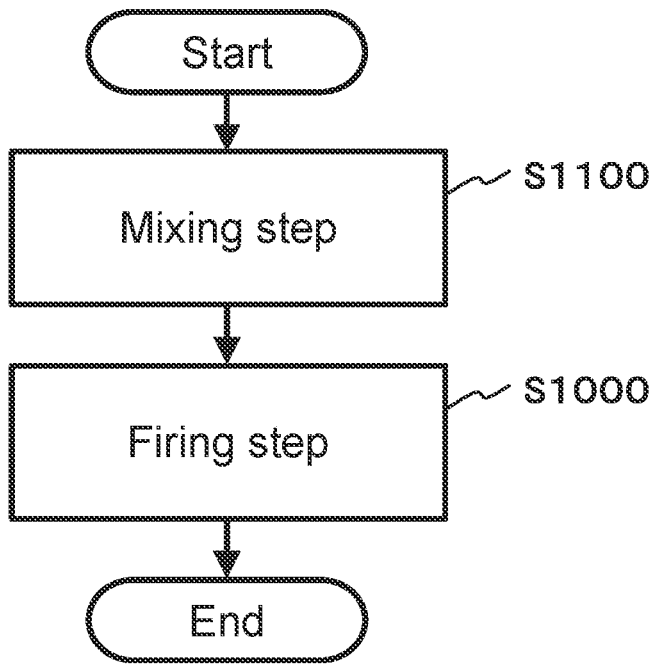
FIG. 3 is a flowchart showing an example of the manufacturing method according to the third embodiment.

FIG. 3 is a flowchart showing an example of the manufacturing method according to the third embodiment.

As shown in FIG. 3, the manufacturing method according to the third embodiment may further include a mixing step S1100.

The mixing step S1100 is performed before the firing step S1000.

In the mixing step S1100, a halide including Li, a halide including Y, a halide including Sm, and a halide including DC, which are raw materials of the solid electrolyte material, are mixed. Thus, a mixed material (i.e., materials to be fired in the firing step S1000) is obtained.

In the mixing step S1100, the halide including Li, the halide including Y, the halide including Sm, and the halide including DC may be prepared at a desired molar ratio and mixed. A known mixing tool (e.g., a mortar, a blender, or a ball mill) may be used to mix the raw materials.

In the mixing step S1100, respective powders of the raw materials may be prepared and mixed. In this case, in the firing step S1000, the mixed material in the form of powder may be fired. The mixed material in the form of powder obtained in the mixing step S1100 may be molded into pellets by pressure. Alternatively, in the firing step S1000, the mixed material in the form of pellet may be fired.

In the mixing step S1100, for example, Li$\alpha$, Y$\beta_3$, Sm$\gamma_3$, and DC$\delta_2$ are mixed. Here, $\alpha$, $\beta$, $\gamma$, and $\delta$ are each independently at least one selected from the group consisting of F, Cl, Br, and I.

In the mixing step S1100, the mixed material may be obtained by mixing not only Li$\alpha$, Y$\beta_3$, Sm$\gamma_3$, and DC$\delta_2$ but also a raw material different from Li$\alpha$, Y$\beta_3$, Sm$\gamma_3$, and DC$\delta_2$ (e.g., M$_e$X$_f$ described above).

In the mixing step S1100, a raw material including Li$\alpha$ as the main component, a raw material including Y$\beta_3$ as the main component, a raw material including Sm$\gamma_3$ as the main component, and a raw material including DC$\delta_2$ as the main component may be mixed. The main component refers to a component whose content at the molar ratio is the highest.

Figure 4:
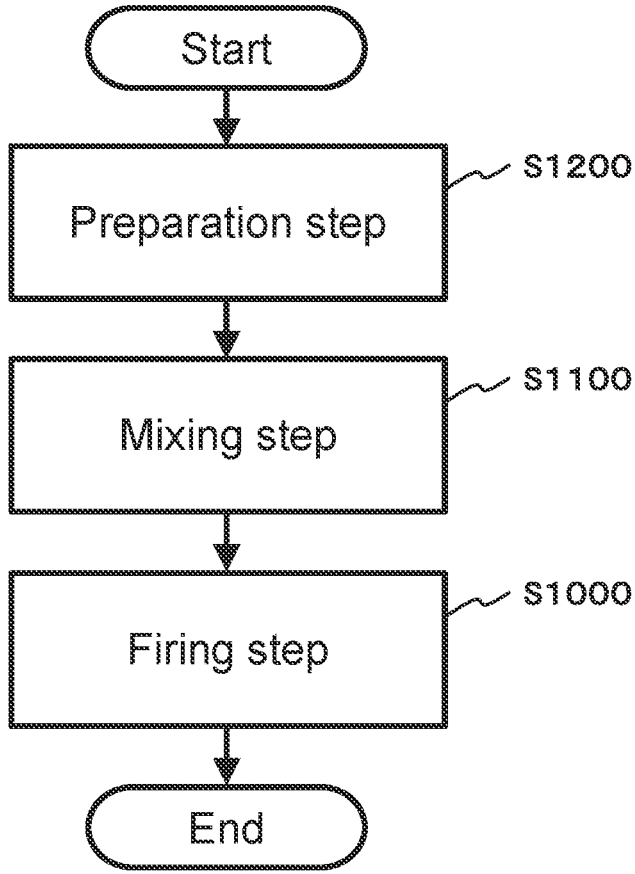
FIG. 4 is a flowchart showing an example of the manufacturing method according to the third embodiment.

FIG. 4 is a flowchart showing an example of the manufacturing method according to the third embodiment.

As shown in FIG. 4, the manufacturing method according to the third embodiment may further include a preparation step S1200.

The preparation step S1200 is performed before the mixing step S1100.

In the preparation step S1200, a halide including Li, a halide including Y, a halide including Sm, and a halide including DC (i.e., materials to be mixed in the mixing step S1100) are prepared.

In the preparation step S1200, for example, Li$\alpha$, Y$\beta_3$, Sm$\gamma_3$, and DC$\delta_2$ are prepared. Here, $\alpha$, $\beta$, $\gamma$, and $\delta$ are each independently at least one selected from the group consisting of F, Cl, Br, and I.

In the preparation step S1200, materials such as Li$\alpha$, Y$\beta_3$, Sm$\gamma_3$, and DC$\delta_2$ may be synthesized. Alternatively, in the preparation step S1200, a known commercially available product (e.g., a material with a purity of 99% or more) may be used.

The materials to be prepared may be dry.

The shape of the materials to be prepared is, for example, crystalline, massive, flake-like, or powdery. In the preparation step S1200, a crystalline, massive, or flake-like raw material may be pulverized to obtain the raw material in the form of powder.

In the preparation step S1200, one or more of M$_e$X$_f$ described above may be added. Owing to this, a solid electrolyte material thus manufactured can have improved characteristics (e.g., ionic conductivity).

In at least one selected from the group consisting of Li$\alpha$, Y$\beta_3$, Sm$\gamma_3$, and DC$\delta_2$ to be prepared, cations (i.e., Li, Y, Sm, and DC) may be partially substituted by another cation (e.g., M described above).

EXAMPLES

The present disclosure will be described below in more detail with reference to examples and comparative examples.

Example 1

(Production of Solid Electrolyte Material)

In an argon atmosphere with a dew point of −60° C. or less (hereinafter referred to as "dry argon atmosphere"), LiBr, LiCl, CaCl$_2$, YCl$_3$, and SmCl$_3$ were prepared as raw material powders at a molar ratio of LiBr:LiCl:CaCl$_2$:YCl$_3$: SmCl$_3$=2:0.8:0.1:0.8:0.2. These raw material powders were pulverized and mixed in an agate mortar. The obtained mixed powder was put into an alumina crucible and fired in a dry argon atmosphere at 500° C. for 60 minutes. A fired product thus obtained was pulverized in an agate mortar. Thus, a powder of a solid electrolyte material according to Example 1 was obtained. The solid electrolyte material according to Example 1 had a composition represented by Li$_{2.8}$Ca$_{0.1}$Y$_{0.8}$Sm$_{0.2}$Br$_2$Cl$_4$.

(Ionic Conductivity Evaluation)

Figure 5:
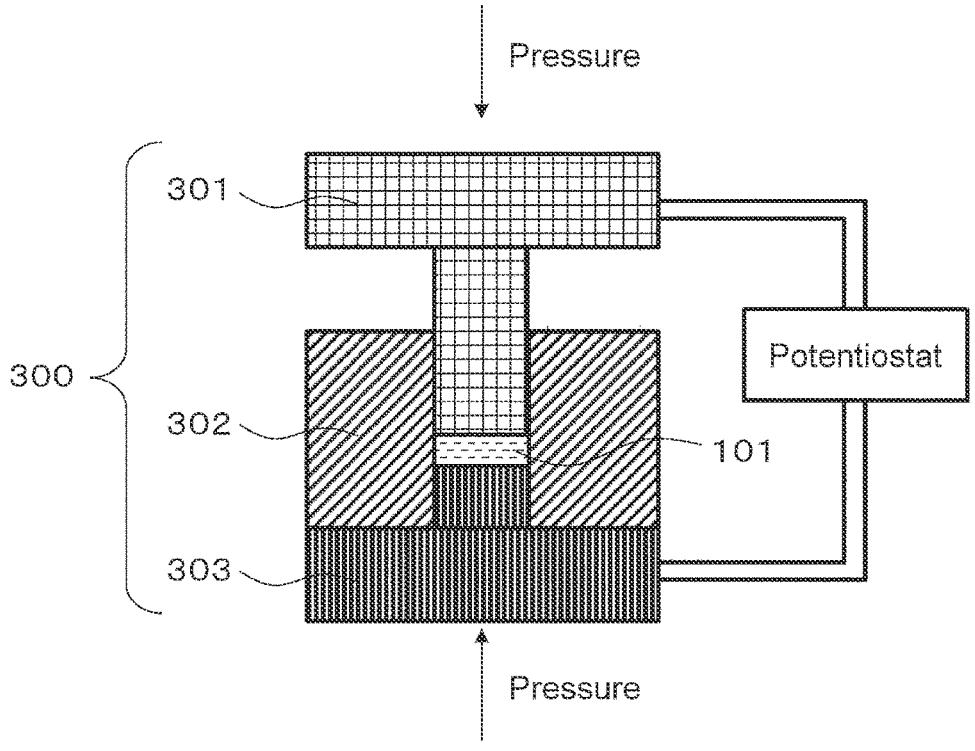
FIG. 5 shows a schematic view of a pressure-molding die 300 used to evaluate the ionic conductivity of solid electrolyte materials.

FIG. 5 shows a schematic view of a pressure-molding die 300 used to evaluate the ionic conductivity of solid electrolyte materials.

The pressure-molding die 300 included an upper punch 301, a die 302, and a lower punch 303. The upper punch 301 and the lower punch 303 were formed of electronically conductive stainless steel. The die 302 was formed of insulating polycarbonate.

The pressure-molding die 300 shown in FIG. 5 was used to evaluate the ionic conductivity of the solid electrolyte material according to Example 1 by the following method.

In a dry atmosphere with a dew point of −60° C. or less, the powder of the solid electrolyte material according to Example 1 was charged into the pressure-molding die 300. Inside the pressure-molding die 300, a pressure of 360 MPa was applied to the solid electrolyte material according to Example 1 with the upper punch 301 and the lower punch 303.

While the pressure was being applied, the upper punch 301 and the lower punch 303 were connected to a potentiostat (VersaSTAT4 available from Princeton Applied Research) equipped with a frequency response analyzer. The upper punch 301 was connected to a working electrode and a potential measurement terminal. The lower punch 303 was connected to a counter electrode and a reference electrode. The impedance of the solid electrolyte material was measured at room temperature by an electrochemical impedance measurement method.

Figure 6:
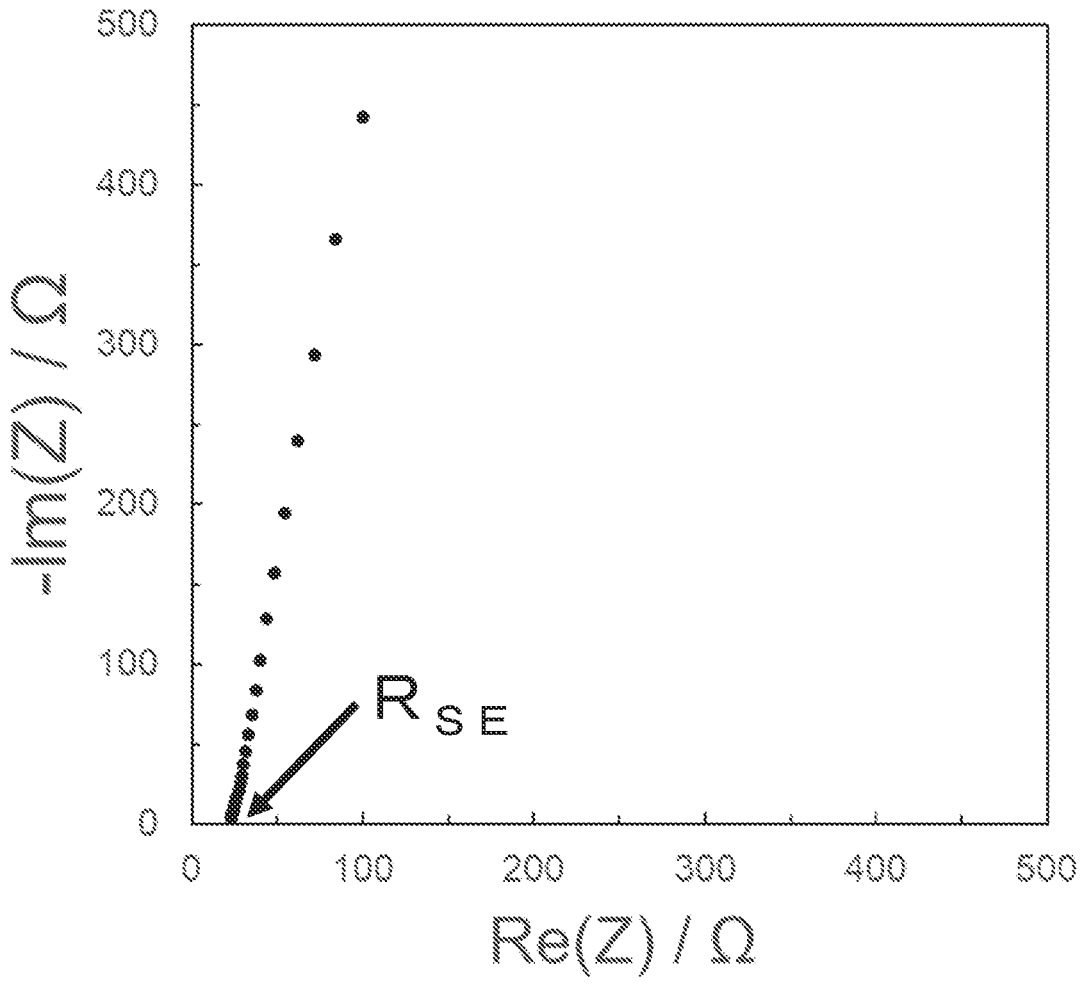
FIG. 6 is a graph showing a Cole-Cole plot obtained by impedance measurement for a solid electrolyte material according to Example 1.

FIG. 6 is a graph showing a Cole-Cole plot obtained by impedance measurement for the solid electrolyte material according to Example 1.

In FIG. 6, the real part of the complex impedance at the measurement point where the absolute value of the phase of the complex impedance was smallest was assumed to be the resistance value of the solid electrolyte material to ion conduction. For the real part, see an arrow $R_{SE}$ shown in FIG. 6. The resistance value was used to calculate the ionic conductivity based on the following mathematical formula (2)

$$\sigma = (R_{SE} \times S/t)^{-1} \qquad (2),$$

where σ represents the ionic conductivity. The symbol S represents the contact area of the solid electrolyte material with the upper punch 301. In other words, the contact area S is equal to the cross-sectional area of the cavity of the die 302 in FIG. 5. The symbol $R_{SE}$ represents the resistance value of the solid electrolyte material in the impedance measurement. The symbol t represents the thickness of the solid electrolyte material. In other words, the thickness t is equal to the thickness of a layer formed of the solid electrolyte material powder 101 in FIG. 5.

The ionic conductivity of the solid electrolyte material according to Example 1 measured at 24° C. was $2.86 \times 10^{-3}$ S/cm.

(X-Ray Diffraction Measurement)

Figure 7:
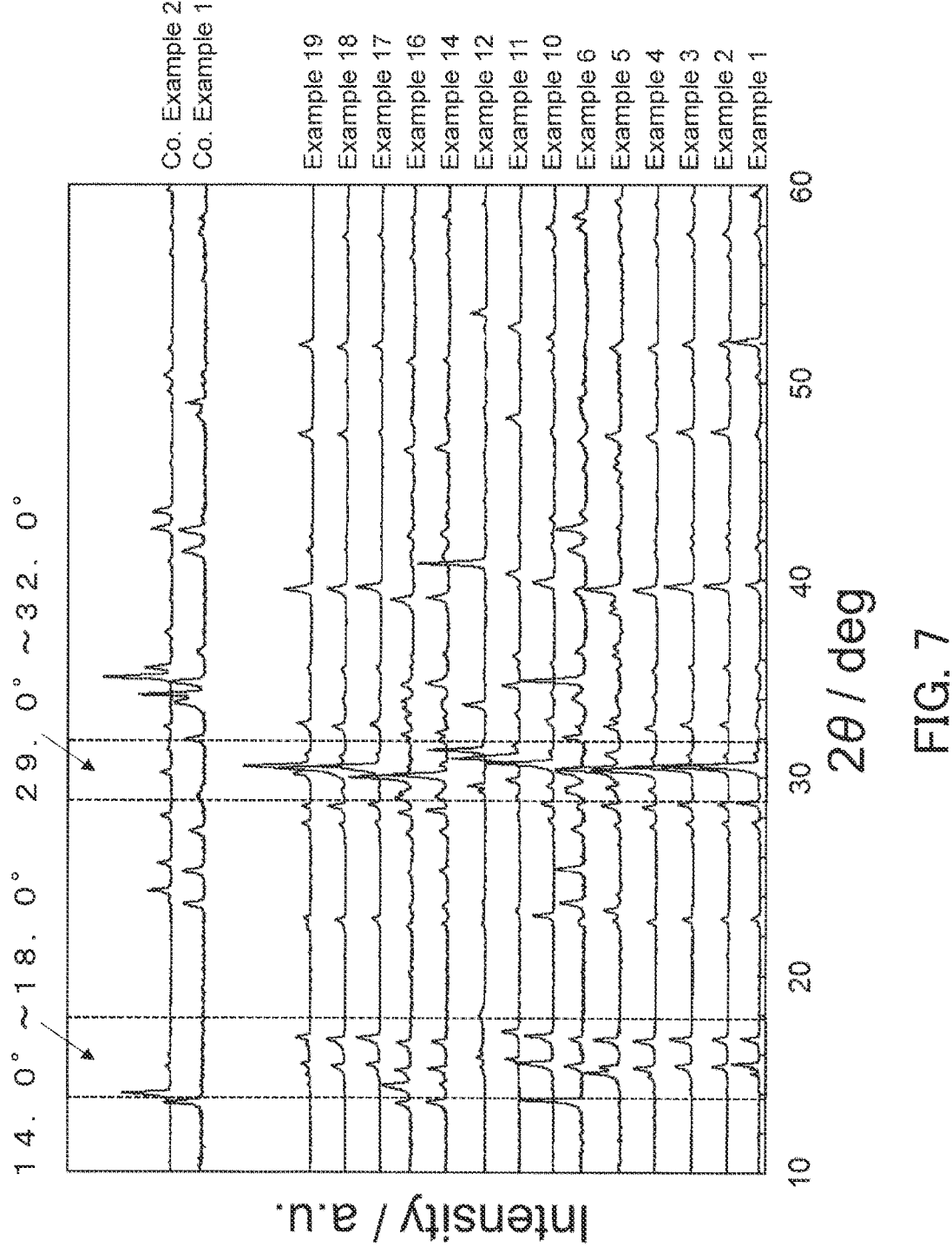
FIG. 7 is a graph showing X-ray diffraction patterns according to Examples 1 to 6 and 10 to 15, and Comparative Examples 1 and 2.

FIG. 7 is a graph showing an X-ray diffraction pattern of the solid electrolyte material according to Example 1. The results shown in FIG. 7 were measured by the following method.

In a dry environment with a dew point of −50° C. or less, the X-ray diffraction pattern of the solid electrolyte material according to Example 1 was measured with an X-ray diffractometer (MiniFlex 600 available from Rigaku Corporation). The θ-2θ method was used to measure the X-ray diffraction pattern with Cu-Kα rays (wavelengths of 1.5405 Å and 1.5444 Å) as X rays sources.

In the X-ray diffraction pattern of the solid electrolyte material according to Example 1, one peak was present within a range from 29.0° to 32.0°, and two peaks were present within a range from 14.0° to 18.0°.

(Production of Battery)

In a dry argon atmosphere, the solid electrolyte material according to Example 1 and $LiCoO_2$ were prepared at a volume ratio of 30:70. These materials were mixed in a mortar. Thus, a mixture was obtained.

In an insulating cylinder having an inner diameter of 9.5 mm, the solid electrolyte material according to Example 1 (80 mg) and the above mixture (10 mg) were stacked in this order. To a stack thus obtained, a pressure of 720 MPa was applied to form a solid electrolyte layer formed of the solid electrolyte material according to Example 1 and a first electrode formed of the above mixture. The solid electrolyte layer had a thickness of 600 μm.

Next, metal In (thickness of 200 μm), metal Li (thickness of 200 μm), and metal In (thickness of 200 μm) were stacked in order on the solid electrolyte layer. To a stack thus obtained, a pressure of 80 MPa was applied to form a second electrode.

Next, stainless steel current collectors were attached to the first electrode and the second electrode, and current collector leads were attached to the current collectors.

Finally, an insulating ferrule was used to block the inside of the insulating cylinder from the outside air atmosphere and seal the cylinder. Thus, a battery according to Example 1 was obtained.

(Charge and Discharge Test)

Figure 9:
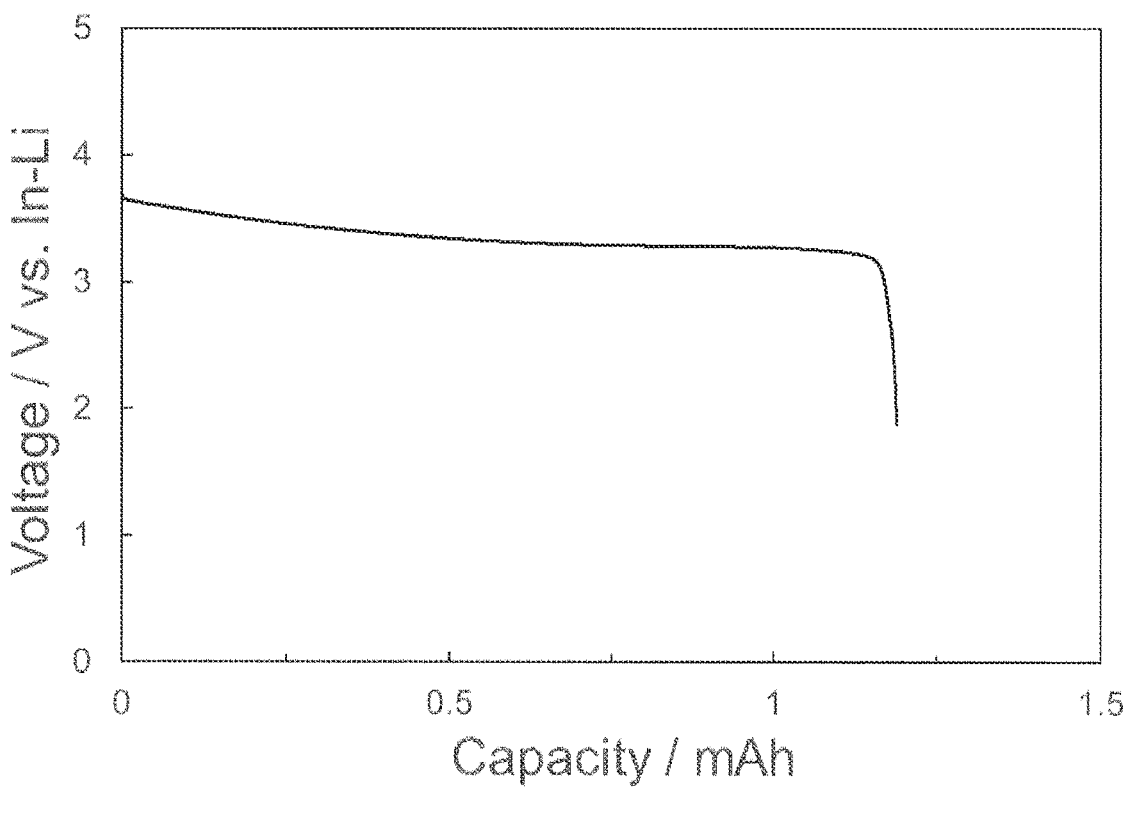
FIG. 9 is a graph showing the initial discharge characteristics of a battery according to Example 1.

FIG. 9 is a graph showing the initial discharge characteristics of the battery according to Example 1. The initial charge and discharge characteristics were measured by the following method.

The battery according to Example 1 was placed in a thermostatic chamber at 25° C.

The battery according to Example 1 was charged to a voltage of 3.68 V at a current density of 78 μA/cm². The current density corresponds to 0.05 C rate.

Next, the battery according to Example 1 was discharged to a voltage of 1.88 V at a current density of 78 μA/cm².

As a result of the charge and discharge test, the battery according to Example 1 had an initial discharge capacity of 1.2 mAh.

Examples 2 to 46

(Production of Solid Electrolyte Material)

In Example 2, LiBr, LiCl, $CaCl_2$, $YCl_3$, and $SmCl_3$ were prepared as raw material powders at a molar ratio of $LiBr:LiCl:CaCl_2:YCl_3:SmCl_3 = 2:0.8:0.1:0.9:0.1$.

In Example 3, LiBr, LiCl, $CaCl_2$, $YCl_3$, and $SmCl_3$ were prepared as raw material powders at a molar ratio of $LiBr:LiCl:CaCl_2:YCl_3:SmCl_3 = 2:0.8:0.1:0.7:0.3$.

In Example 4, LiBr, LiCl, $CaCl_2$, $YCl_3$, and $SmCl_3$ were prepared as raw material powders at a molar ratio of $LiBr:LiCl:CaCl_2:YCl_3:SmCl_3 = 2:0.8:0.1:0.5:0.5$.

In Example 5, LiBr, LiCl, $CaCl_2$, $YCl_3$, and $SmCl_3$ were prepared as raw material powders at a molar ratio of $LiBr:LiCl:CaCl_2:YCl_3:SmCl_3 = 2:0.8:0.1:0.3:0.7$.

In Example 6, LiBr, LiCl, $CaCl_2$, $YCl_3$, and $SmCl_3$ were prepared as raw material powders at a molar ratio of $LiBr:LiCl:CaCl_2:YCl_3:SmCl_3 = 2:0.8:0.1:0.1:0.9$.

In Example 7, LiBr, $CaBr_2$, $YBr_3$, and $SmBr_3$ as raw material powders were prepared at a molar ratio of $LiBr:CaBr_2:YBr_3:SmBr_3 = 2.8:0.1:0.8:0.2$.

In Example 8, LiBr, $CaBr_2$, $YCl_3$, and $SmCl_3$ were prepared as raw material powders at a molar ratio of $LiBr:CaBr_2:YCl_3:SmCl_3 = 2.8:0.1:0.8:0.2$.

In Example 9, LiBr, LiCl, $CaCl_2$, $YCl_3$, and $SmCl_3$ were prepared as raw material powders at a molar ratio of $LiBr:LiCl:CaCl_2:YCl_3:SmCl_3 = 2.5:0.3:0.1:0.8:0.2$.

In Example 10, LiBr, LiCl, $CaCl_2$, $YCl_3$, and $SmCl_3$ were prepared as raw material powders at a molar ratio of $LiBr:LiCl:CaCl_2:YCl_3:SmCl_3 = 1.5:1.3:0.1:0.8:0.2$.

In Example 11, LiBr, LiCl, $CaCl_2$, $YCl_3$, and $SmCl_3$ were prepared as raw material powders at a molar ratio of $LiBr:LiCl:CaCl_2:YCl_3:SmCl_3=1:1.8:0.1:0.8:0.2$.

In Example 12, LiCl, $CaCl_2$, $YCl_3$, and $SmCl_3$ were prepared as raw material powders at a molar ratio of $LiCl:CaCl_2:YCl_3:SmCl_3=2.8:0.1:0.8:0.2$.

In Example 13, LiBr, $CaBr_2$, $YCl_3$, and $SmCl_3$ were prepared as raw material powders at a molar ratio of $LiBr:CaBr_2:YCl_3:SmCl_3=2.8:0.1:0.9:0.1$.

In Example 14, LiBr, $CaBr_2$, $YCl_3$, and $SmCl_3$ were prepared as raw material powders at a molar ratio of $LiBr:CaBr_2:YCl_3:SmCl_3=2.8:0.1:0.1:0.9$.

In Example 15, LiBr, $CaBr_2$, $YCl_3$, and $SmCl_3$ were prepared as raw material powders at a molar ratio of $LiBr:CaBr_2:YCl_3:SmCl_3=2.7:0.15:0.9:0.1$.

In Example 16, LiBr, $CaBr_2$, $YCl_3$, and $SmCl_3$ were prepared as raw material powders at a molar ratio of $LiBr:CaBr_2:YCl_3:SmCl_3=2.7:0.15:0.1:0.9$.

In Example 17, LiBr, LiCl, $CaCl_2$, $YCl_3$, and $SmCl_3$ were prepared as raw material powders at a molar ratio of $LiBr:LiCl:CaCl_2:YCl_3:SmCl_3=2:0.75:0.125:0.8:0.2$. In Example 17, the firing time was 180 minutes.

In Example 18, LiBr, LiCl, $CaCl_2$, $YCl_3$, and $SmCl_3$ were prepared as raw material powders at a molar ratio of $LiBr:LiCl:CaCl_2:YCl_3:SmCl_3=2:0.7:0.15:0.8:0.2$. In Example 18, the firing time was 180 minutes.

In Example 19, LiBr, LiCl, $CaCl_2$, $YCl_3$, and $SmCl_3$ were prepared as raw material powders at a molar ratio of $LiBr:LiCl:CaCl_2:YCl_3:SmCl_3=2:0.5:0.25:0.8:0.2$. In Example 19, the firing time was 180 minutes.

In Example 20, LiBr, LiCl, $MgCl_2$, $YCl_3$, and $SmCl_3$ were prepared as raw material powders at a molar ratio of $LiBr:LiCl:MgCl_2:YCl_3:SmCl_3=2:0.8:0.1:0.8:0.2$.

In Example 21, LiBr, LiCl, $SrCl_2$, $YCl_3$, and $SmCl_3$ were prepared as raw material powders at a molar ratio of $LiBr:LiCl:SrCl_2:YCl_3:SmCl_3=2:0.8:0.1:0.8:0.2$.

In Example 22, LiBr, LiCl, $BaCl_2$, $YCl_3$, and $SmCl_3$ were prepared as raw material powders at a molar ratio of $LiBr:LiCl:BaCl_2:YCl_3:SmCl_3=2:0.8:0.1:0.8:0.2$.

In Example 23, LiBr, LiCl, $ZnCl_2$, $YCl_3$, and $SmCl_3$ were prepared as raw material powders at a molar ratio of $LiBr:LiCl:ZnCl_2:YCl_3:SmCl_3=2:0.8:0.1:0.8:0.2$.

In Example 24, LiBr, LiCl, $CaCl_2$, $YCl_3$, and $SmCl_3$ were prepared as raw material powders at a molar ratio of $LiBr:LiCl:CaCl_2:YCl_3:SmCl_3=2:0.65:0.1:0.85:0.2$.

In Example 25, LiBr, LiCl, $CaCl_2$, $YCl_3$, and $SmCl_3$ were prepared as raw material powders at a molar ratio of $LiBr:LiCl:CaCl_2:YCl_3:SmCl_3=2:0.65:0.1:0.9:0.15$.

Solid electrolyte materials according to Examples 2 to 25 were obtained in the same manner as in Example 1 except for the matters described above.

In Examples 26 to 46, solid electrolyte materials according to Examples 26 to 46 were obtained in the same manner as in Example 1 except for the firing time and the firing temperature. The firing temperature and the firing time are shown in Table 1-2.

(Ionic Conductivity Evaluation)

The ionic conductivity was measured for the solid electrolyte materials according to Examples 2 to 46 in the same manner as in Example 1. The measurement results are shown in Tables 1-1 and 1-2.

(X-Ray Diffraction Measurement)

The X-ray diffraction pattern was measured for the solid electrolyte materials according to Examples 2 to 19 in the same manner as in Example 1.

FIG. 7 is a graph showing the X-ray diffraction patterns of the solid electrolyte materials according to Examples 1 to 6, 10 to 12, 14, and 16 to 19. The angles of the observed diffraction peaks are shown in Table 2-1. All of the solid electrolyte materials shown in FIG. 7 had the first crystalline phase.

Figure 8:
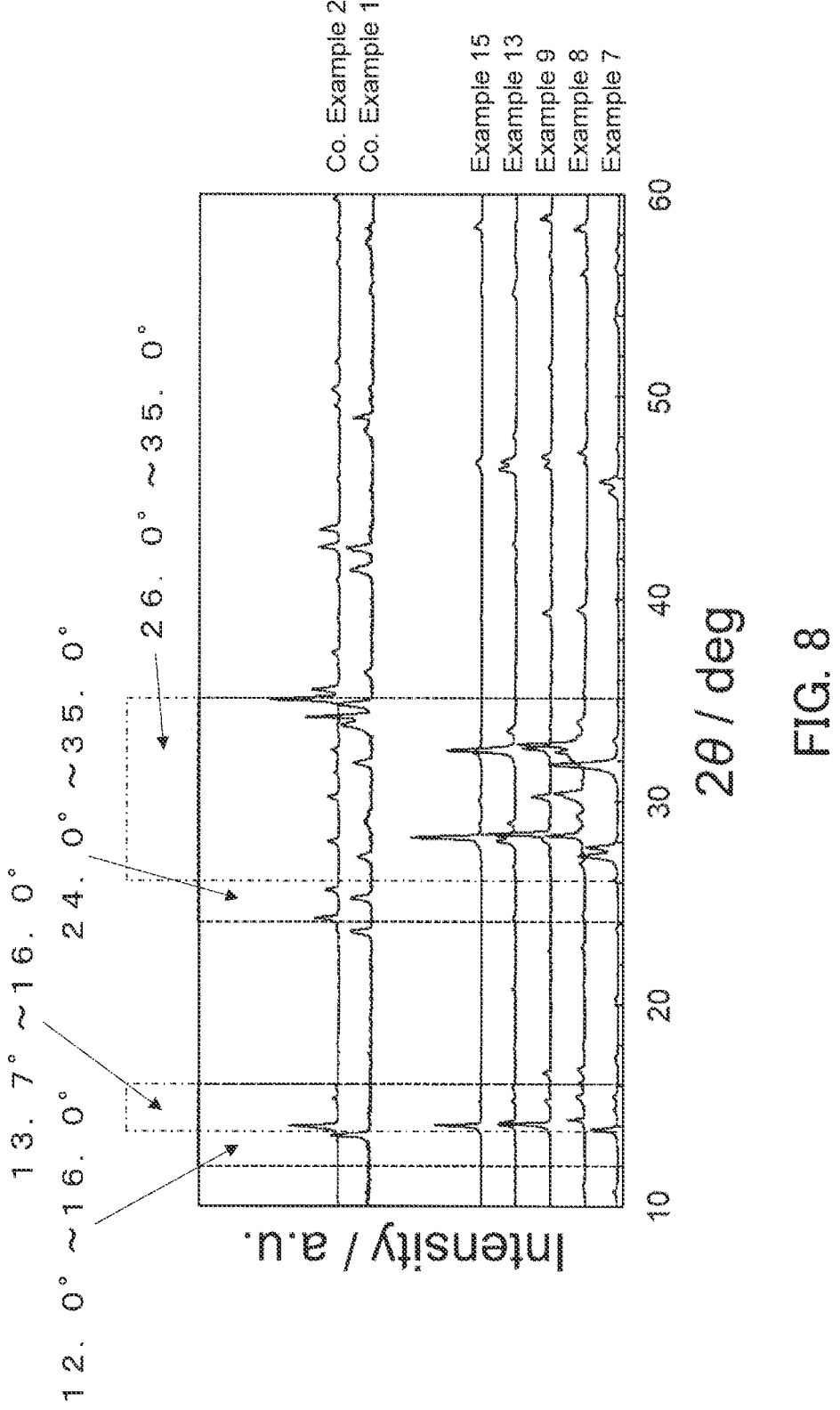
FIG. 8 is a graph showing X-ray diffraction patterns according to Examples 7 to 9, and Comparative Examples 1 and 2.

FIG. 8 is a graph showing the X-ray diffraction patterns of the solid electrolyte materials according to Examples 7 to 9, 13, and 15. The angles of the observed diffraction peaks are shown in Table 2-2. All of the solid electrolyte materials shown in FIG. 8 had the second crystalline phase. Examples 8, 9, and 15 had not only the second crystalline phase but also the first crystalline phase.

(Charge and Discharge Test)

Batteries according to Examples 2 to 46 were obtained in the same manner as in Example 1 by using the solid electrolyte materials according to Examples 2 to 46. A charge and discharge test was performed in the same manner as in Example 1 by using the batteries according to Examples 2 to 46. As a result, the batteries according to Examples 2 to 46 were favorably charged and discharged as well as the battery according to Example 1.

Comparative Examples 1 and 2

(Production of Solid Electrolyte Material)

In Comparative Example 1, LiBr, LiCl, $CaCl_2$, and $SmCl_3$ were prepared as raw material powders at a molar ratio of $LiBr:LiCl:CaCl_2:SmCl_3=2:0.8:0.1:1$. A solid electrolyte material according to Comparative Example 1 was obtained in the same manner as in Example 1 except for this.

In Comparative Example 2, LiCl, $YCl_3$, and $SmCl_3$ were prepared as raw material powders at a molar ratio of $LiCl:YCl_3:SmCl_3=3:0.1:0.9$. A solid electrolyte material according to Comparative Example 2 was obtained in the same manner as in Example 1 except for this.

(Ionic Conductivity Evaluation)

The ionic conductivity was measured for the solid electrolyte materials according to Comparative Examples 1 and 2 in the same manner as in Example 1. The measurement results are shown in Table 1-2.

(X-Ray Diffraction Measurement)

The X-ray diffraction pattern was measured for the solid electrolyte materials according to Comparative Examples 1 and 2 in the same manner as in Example 1. FIG. 7 and FIG. 8 are graphs showing the X-ray diffraction patterns of the solid electrolyte materials according to Comparative Examples 1 and 2. The angles of the observed diffraction peaks are shown in Tables 2-1 and 2-2.

TABLE 1-1

| | Composition | a | b | c | d | DC | Firing temp. (° C.) | Firing time (min) | Ionic conductivity (S/cm) |
|---|---|---|---|---|---|---|---|---|---|
| Example 1 | $Li_{2.8}Ca_{0.1}Y_{0.8}Sm_{0.2}Br_2Cl_4$ | 0.1 | 0.2 | 4 | 0 | Ca | 500 | 60 | $2.86 \times 10^{-3}$ |
| Example 2 | $Li_{2.8}Ca_{0.1}Y_{0.9}Sm_{0.1}Br_2Cl_4$ | 0.1 | 0.1 | 4 | 0 | Ca | 500 | 60 | $2.88 \times 10^{-3}$ |
| Example 3 | $Li_{2.8}Ca_{0.1}Y_{0.7}Sm_{0.3}Br_2Cl_4$ | 0.1 | 0.3 | 4 | 0 | Ca | 500 | 60 | $2.78 \times 10^{-3}$ |
| Example 4 | $Li_{2.8}Ca_{0.1}Y_{0.5}Sm_{0.5}Br_2Cl_4$ | 0.1 | 0.5 | 4 | 0 | Ca | 500 | 60 | $2.49 \times 10^{-3}$ |

TABLE 1-1-continued

| Composition | a | b | c | d | DC | Firing temp. (° C.) | Firing time (min) | Ionic conductivity (S/cm) |
|---|---|---|---|---|---|---|---|---|
| Example 5 | $Li_{2.8}Ca_{0.1}Y_{0.3}Sm_{0.7}Br_2Cl_4$ | 0.1 | 0.7 | 4 | 0 | Ca | 500 | 60 | $6.56 \times 10^{-4}$ |
| Example 6 | $Li_{2.8}Ca_{0.1}Y_{0.1}Sm_{0.9}Br_2Cl_4$ | 0.1 | 0.9 | 4 | 0 | Ca | 500 | 60 | $1.81 \times 10^{-5}$ |
| Example 7 | $Li_{2.8}Ca_{0.1}Y_{0.8}Sm_{0.2}Br_6$ | 0.1 | 0.2 | 0 | 0 | Ca | 500 | 60 | $8.98 \times 10^{-4}$ |
| Example 8 | $Li_{2.8}Ca_{0.1}Y_{0.8}Sm_{0.2}Br_2Cl_3$ | 0.1 | 0.2 | 3 | 0 | Ca | 500 | 60 | $8.38 \times 10^{-4}$ |
| Example 9 | $Li_{2.8}Ca_{0.1}Y_{0.8}Sm_{0.2}Br_{2.5}Cl_{3.5}$ | 0.1 | 0.2 | 3.5 | 0 | Ca | 500 | 60 | $1.43 \times 10^{-3}$ |
| Example 10 | $Li_{2.8}Ca_{0.1}Y_{0.8}Sm_{0.2}BrCl_5$ | 0.1 | 0.2 | 4.5 | 0 | Ca | 500 | 60 | $1.66 \times 10^{-3}$ |
| Example 11 | $Li_{2.8}Ca_{0.1}Y_{0.8}Sm_{0.2}BrCl_5$ | 0.1 | 0.2 | 5 | 0 | Ca | 500 | 60 | $9.29 \times 10^{-4}$ |
| Example 12 | $Li_{2.8}Ca_{0.1}Y_{0.9}Sm_{0.1}Br3Cl_3$ | 0.1 | 0.2 | 6 | 0 | Ca | 500 | 60 | $1.58 \times 10^{-4}$ |
| Example 13 | $Li_{2.8}Ca_{0.1}Y_{0.9}Sm_{0.1}Br3Cl_3$ | 0.1 | 0.1 | 3 | 0 | Ca | 500 | 60 | $8.84 \times 10^{-4}$ |
| Example 14 | $Li_{2.8}Ca_{0.1}Y_{0.1}Sm_{0.9}Br_3Cl_3$ | 0.1 | 0.9 | 3 | 0 | Ca | 500 | 60 | $3.06 \times 10^{-4}$ |
| Example 15 | $Li_{2.7}Ca_{0.15}Y_{0.9}Sm_{0.1}Br3Cl_3$ | 0.15 | 0.1 | 3 | 0 | Ca | 500 | 60 | $1.16 \times 10\text{-}3$ |
| Example 16 | $Li_{2.7}Ca_{0.15}Y_{0.1}Sm_{0.9}Br3Cl_3$ | 0.15 | 0.9 | 3 | 0 | Ca | 500 | 60 | $1.98 \times 10^{-4}$ |
| Example 17 | $Li_{2.75}Ca_{0.125}Y_{0.8}Sm_{0.2}Br_2Cl_4$ | 0.125 | 0.2 | 4 | 0 | Ca | 500 | 180 | $2.01 \times 10^{-3}$ |
| Example 18 | $Li_{2.7}Ca_{0.15}Y_{0.8}Sm_{0.2}Br_2Cl_4$ | 0.15 | 0.2 | 4 | 0 | Ca | 500 | 180 | $1.96 \times 10^{-3}$ |
| Example 19 | $Li_{2.5}Ca_{0.25}Y_{0.8}Sm_{0.2}Br_2Cl_4$ | 0.25 | 0.2 | 4 | 0 | Ca | 500 | 180 | $1.09 \times 10^{-3}$ |
| Example 20 | $Li_{2.8}Mg_{0.1}Y_{0.8}Sm_{0.2}Br_2Cl_4$ | 0.1 | 0.2 | 4 | 0 | Mg | 500 | 60 | $7.74 \times 10^{-4}$ |
| Example 21 | $Li_{2.8}Sr_{0.1}Y_{0.8}Sm_{0.2}Br_2Cl_4$ | 0.1 | 0.2 | 4 | 0 | Sr | 500 | 60 | $8.29 \times 10^{-4}$ |
| Example 22 | $Li_{2.8}Ba_{0.1}Y_{0.8}Sm_{0.2}Br_2Cl_4$ | 0.1 | 0.2 | 4 | 0 | Ba | 500 | 60 | $7.27 \times 10^{-4}$ |
| Example 23 | $Li_{2.8}Zn_{0.1}Y_{0.8}Sm_{0.2}Br_2Cl_4$ | 0.1 | 0.2 | 4 | 0 | Zn | 500 | 60 | $7.19 \times 10^{-4}$ |
| Example 24 | $Li_{2.65}Ca_{0.1}Y_{0.85}Sm_{0.2}Br_2Cl_4$ | 0.1 | 0.15 | 4 | 0.05 | Ca | 500 | 60 | $2.00 \times 10^{-3}$ |
| Example 25 | $Li_{2.65}Ca_{0.1}Y_{0.9}Sm_{0.15}Br_2Cl_4$ | 0.1 | 0.1 | 4 | 0.05 | Ca | 500 | 60 | $1.56 \times 10^{-3}$ |

TABLE 1-2

| Composition | a | b | c | d | DC | Firing temp. (° C.) | Firing time (min) | Ionic conductivity (S/cm) |
|---|---|---|---|---|---|---|---|---|
| Example 26 | $Li_{2.8}Ca_{0.1}Y_{0.8}Sm_{0.2}Br_2Cl_4$ | 0.1 | 0.2 | 4 | 0 | Ca | 650 | 60 | $1.93 \times 10^{-3}$ |
| Example 27 | $Li_{2.8}Ca_{0.1}Y_{0.8}Sm_{0.2}Br_2Cl_4$ | 0.1 | 0.2 | 4 | 0 | Ca | 600 | 60 | $1.90 \times 10^{-3}$ |
| Example 28 | $Li_{2.8}Ca_{0.1}Y_{0.8}Sm_{0.2}Br_2Cl_4$ | 0.1 | 0.2 | 4 | 0 | Ca | 550 | 60 | $2.52 \times 10^{-3}$ |
| Example 29 | $Li_{2.8}Ca_{0.1}Y_{0.8}Sm_{0.2}Br_2Cl_4$ | 0.1 | 0.2 | 4 | 0 | Ca | 500 | 1 | $2.58 \times 10^{-3}$ |
| Example 30 | $Li_{2.8}Ca_{0.1}Y_{0.8}Sm_{0.2}Br_2Cl_4$ | 0.1 | 0.2 | 4 | 0 | Ca | 500 | 30 | $2.58 \times 10^{-3}$ |
| Example 31 | $Li_{2.8}Ca_{0.1}Y_{0.8}Sm_{0.2}Br_2Cl_4$ | 0.1 | 0.2 | 4 | 0 | Ca | 500 | 120 | $2.01 \times 10^{-3}$ |
| Example 32 | $Li_{2.8}Ca_{0.1}Y_{0.8}Sm_{0.2}Br_2Cl_4$ | 0.1 | 0.2 | 4 | 0 | Ca | 500 | 180 | $1.94 \times 10^{-3}$ |
| Example 33 | $Li_{2.8}Ca_{0.1}Y_{0.8}Sm_{0.2}Br_2Cl_4$ | 0.1 | 0.2 | 4 | 0 | Ca | 500 | 720 | $1.20 \times 10^{-3}$ |
| Example 34 | $Li_{2.8}Ca_{0.1}Y_{0.8}Sm_{0.2}Br_2Cl_4$ | 0.1 | 0.2 | 4 | 0 | Ca | 500 | 3600 | $1.01 \times 10^{-4}$ |
| Example 35 | $Li_{2.8}Ca_{0.1}Y_{0.8}Sm_{0.2}Br_2Cl_4$ | 0.1 | 0.2 | 4 | 0 | Ca | 470 | 60 | $2.97 \times 10^{-3}$ |
| Example 36 | $Li_{2.8}Ca_{0.1}Y_{0.8}Sm_{0.2}Br_2Cl_4$ | 0.1 | 0.2 | 4 | 0 | Ca | 470 | 180 | $1.78 \times 10^{-3}$ |
| Example 37 | $Li_{2.8}Ca_{0.1}Y_{0.8}Sm_{0.2}Br_2Cl_4$ | 0.1 | 0.2 | 4 | 0 | Ca | 470 | 360 | $1.96 \times 10^{-3}$ |
| Example 38 | $Li_{2.8}Ca_{0.1}Y_{0.8}Sm_{0.2}Br_2Cl_4$ | 0.1 | 0.2 | 4 | 0 | Ca | 470 | 540 | $1.79 \times 10^{-3}$ |
| Example 39 | $Li_{2.8}Ca_{0.1}Y_{0.8}Sm_{0.2}Br_2Cl_4$ | 0.1 | 0.2 | 4 | 0 | Ca | 470 | 720 | $2.59 \times 10^{-3}$ |
| Example 40 | $Li_{2.8}Ca_{0.1}Y_{0.8}Sm_{0.2}Br_2Cl_4$ | 0.1 | 0.2 | 4 | 0 | Ca | 450 | 60 | $2.10 \times 10^{-3}$ |
| Example 41 | $Li_{2.8}Ca_{0.1}Y_{0.8}Sm_{0.2}Br_2Cl_4$ | 0.1 | 0.2 | 4 | 0 | Ca | 450 | 720 | $1.49 \times 10^{-3}$ |
| Example 42 | $Li_{2.8}Ca_{0.1}Y_{0.8}Sm_{0.2}Br_2Cl_4$ | 0.1 | 0.2 | 4 | 0 | Ca | 420 | 60 | $1.03 \times 10^{-3}$ |
| Example 43 | $Li_{2.8}Ca_{0.1}Y_{0.8}Sm_{0.2}Br_2Cl_4$ | 0.1 | 0.2 | 4 | 0 | Ca | 420 | 720 | $1.97 \times 10^{-3}$ |
| Example 44 | $Li_{2.8}Ca_{0.1}Y_{0.8}Sm_{0.2}Br_2Cl_4$ | 0.1 | 0.2 | 4 | 0 | Ca | 400 | 60 | $4.40 \times 10^{4}$ |
| Example 45 | $Li_{2.8}Ca_{0.1}Y_{0.8}Sm_{0.2}Br_2Cl_4$ | 0.1 | 0.2 | 4 | 0 | Ca | 400 | 720 | $1.39 \times 10^{-3}$ |
| Example 46 | $Li_{2.8}Ca_{0.1}Y_{0.8}Sm_{0.2}Br_2Cl_4$ | 0.1 | 0.2 | 4 | 0 | Ca | 200 | 9000 | $1.18 \times 10^{-4}$ |
| Comparative Example 1 | $Li_{2.8}Ca_{0.1}Y_{0.8}SmBr_2Cl_4$ | 0.1 | 1 | 4 | 0 | Ca | 500 | 60 | $1.61 \times 10^{-8}$ |
| Comparative Example 2 | $Li_3Y_{0.1}Sm_{0.9}Cl_6$ | 0 | 0.9 | 6 | 0 | — | 500 | 60 | $8.40 \times 10^{-7}$ |

TABLE 2-1

| | Angle of diffraction peak (°) | |
|---|---|---|
| | 14.0° to 18.0° | 29.0° to 32.0° |
| Example 1 | 15.5, 16.8 | 30.6 |
| Example 2 | 15.4, 16.8 | 30.6 |
| Example 3 | 15.4, 16.8 | 30.5 |
| Example 4 | 15.3, 16.6 | 30.4 |
| Example 5 | 15.4, 16.7 | 30.4 |
| Example 6 | 15.4, 16.8 | 30.4 |
| Example 10 | 15.5, 16.9 | 30.7 |
| Example 11 | 15.7, 17.1 | 30.9 |
| Example 12 | 16.2, 17.8 | 31.4 |
| Example 14 | 15.2, 16.6 | 30.1 |
| Example 16 | 15.2, 16.6 | 30.0 |

TABLE 2-1-continued

| | Angle of diffraction peak (°) | |
|---|---|---|
| | 14.0° to 18.0° | 29.0° to 32.0° |
| Example 17 | 15.4, 16.8 | 30.5 |
| Example 18 | 15.4, 16.7 | 30.4 |
| Example 19 | 15.5, 16.8 | 30.6 |
| Comparative Example 1 | — | — |
| Comparative Example 2 | 15.9, 17.4 | 31.5 |

TABLE 2-2

| | Angle of diffraction peak (°) | | | |
| | 12.0° to 16.0° | | 24.0° to 35.0° | |
| | Peak attributed to second crystalline phase | Peak attributed to first crystalline phase | Peak attributed to second crystalline phase | Peak attributed to first crystalline phase |
|---|---|---|---|---|
| Example 7 | 13.8 | — | 27.3, 27.8, 31.8 | — |
| Example 8 | 14.3 | 15.5, 16.8 | 28.3, 32.5, 32.8 | 30.4 |
| Example 9 | 14.1 | 15.3, 16.6 | 28.4, 32.6 | 30.3 |
| Example 13 | 14.1 | — | 28.1, 28.3, 32.5 | — |
| Example 15 | 14.0 | 15.2, 16.5 | 28.2, 32.4 | 30.1 |
| Comparative Example 1 | 13.5 | — | — | — |
| Comparative Example 2 | — | 15.9, 17.4 | — | 31.5 |

<Discussion>

The solid electrolyte materials according to Examples 1 to 46 have higher ionic conductivity of $1 \times 10^{-5}$ S/cm or more near room temperature.

As is clear from Examples 17 to 19 and 32, a solid electrolyte material having the value a being 0.1 or more and 0.25 or less has high ionic conductivity. As is clear from comparing Examples 17, 18, and 32 with Example 19, a solid electrolyte material having the value a being 0.1 or more and 0.15 or less has higher ionic conductivity.

As is clear from Examples 1 to 46, a solid electrolyte material having the value b being 0.1 or more and 0.9 or less has high ionic conductivity. As is clear from comparing Examples 1 to 4 with Examples 5 and 6, a solid electrolyte material having the value b being 0.1 or more and 0.5 or less has higher ionic conductivity.

As is clear from comparing Examples 1, 9, and 10 with Examples 7, 8, 11, and 12, a solid electrolyte material having the value c being 3.5 or more and 4.5 or less has high ionic conductivity.

As is clear from Examples 1, 16, and 17, a solid electrolyte material including DC being at least one selected from the group consisting of Ca, Mg, and Sr has high ionic conductivity. As is clear from comparing Example 1 with Examples 16 and 17, a solid electrolyte material including DC being Ca has higher ionic conductivity.

As is clear from Examples 1, 18, and 19, a solid electrolyte material having the value d being 0 or more and 0.05 or less has high ionic conductivity.

In all of Examples 1 to 46, the batteries were charged and discharged at room temperature.

As is clear from comparing Examples 1, 26 to 28, 35, 40, and 42 with Example 44, a solid electrolyte material having the firing temperature being 450° C. or more and 650° C. or less has higher ionic conductivity. It is assumed that this is because the solid electrolyte material has higher crystallinity. As is clear from comparing Examples 1, 26 to 28, 35, and 40 with Examples 26 and 27, a solid electrolyte material having the firing temperature being 450° C. or more and 550° C. or less has higher ionic conductivity. It is assumed that this is because the occurrence of thermal decomposition at a high temperature, that is, the occurrence of composition deviation of the solid electrolyte material can be suppressed.

As is clear from comparing Examples 1 and 29 to 32 with Examples 33 and 34, a solid electrolyte material having the firing time being 1 minute or more and 180 minutes or less has higher ionic conductivity. It is assumed that this is because thermal decomposition (i.e., composition deviation of the solid electrolyte material) caused by long-time firing can be suppressed.

The solid electrolyte materials according to Examples 1 to 46 are free of sulfur, and accordingly generate no hydrogen sulfide.

As described above, the solid electrolyte material according to the present disclosure has high lithium-ion conductivity and is suitable for providing a battery that can be charged and discharged favorably. Furthermore, the method of manufacturing the solid electrolyte material according to the present disclosure is an industrially productive method in which a solid electrolyte material having high ionic conductivity can be manufactured simply.

INDUSTRIAL APPLICABILITY

The solid electrolyte material of the present disclosure and the method of manufacturing the same are utilized in, for example, batteries (e.g., all-solid-state lithium-ion secondary batteries).

What is claimed is:

1. A solid electrolyte particle consisting of Li, DC, Y, Sm and X or made of a compound including Li, DC, Y, Sm and X as a main component, wherein the DC is at least one selected from the group consisting of Mg, Ca, Sr, Ba, and Zn, the X is at least one selected from the group consisting of Br and Cl, when the solid electrolyte particle is made of the compound including Li, DC, Y, Sm and X as a main component, a largest amount component of the particle in molar ratio is the compound, a median diameter of the solid electrolyte particles is 0.5 μm or more and 10 μm or less, and the solid electrolyte particle is represented by the following composition formula (1), $$Li_{3-2a-3d}DC_aY_{1-b}Sm_{b+d}Br_{6-c}Cl_c \qquad (1)$$

where the following four mathematical relations are satisfied:

$0 < a \leq 0.25$;

$0 < b < 1$;

$0 \leq c \leq 6$; and $0 \leq d \leq 0.05$.

2. The solid electrolyte particle according to claim 1, wherein
the DC is Ca.

3. The solid electrolyte particle according to claim 1, wherein
a mathematical relation $0.01 \leq a \leq 0.15$ is satisfied.

4. The solid electrolyte particle according to claim 1, wherein
a mathematical relation $0.01 \leq b \leq 0.5$ is satisfied.

5. The solid electrolyte particle according to claim 1, wherein
a mathematical relation $3.5 \leq c \leq 4.5$ is satisfied.

6. The solid electrolyte particle according to claim 1, wherein
in an X-ray diffraction pattern obtained by X-ray diffraction measurement of a plurality of solid electrolyte particles each being the solid electrolyte particle of claim 1, using a Cu-Kα ray,
at least one peak is present within a range of a diffraction angle $2\theta$ from $29.0°$ to $32.0°$, and
at least two peaks are present within a range of the diffraction angle $2\theta$ from $14.0°$ to $18.0°$.

7. The solid electrolyte particle according to claim 1, wherein
in an X-ray diffraction pattern obtained by X-ray diffraction measurement of a plurality of solid electrolyte particles each being the solid electrolyte particle of claim 1, using a Cu-Kα ray,
at least two peaks are present within a range of a diffraction angle $2\theta$ from $24.0°$ to $35.0°$, and
at least one peak is present within a range of the diffraction angle $2\theta$ from $12.0°$ to $16.0°$.

8. The solid electrolyte particle according to claim 7, wherein
in the X-ray diffraction pattern,
at least two peaks are present within a range of the diffraction angle $2\theta$ from $26.0°$ to $35.0°$, and
at least one peak is present within a range of the diffraction angle $2\theta$ from $13.7°$ to $16.0°$.

9. The solid electrolyte particle according to claim 1, wherein $0 \leq c < 6$ is satisfied.

10. The solid electrolyte particle according to claim 1, wherein $0 < c < 6$ is satisfied.

11. A battery comprising:
a positive electrode;
a negative electrode; and
an electrolyte layer provided between the positive electrode and the negative electrode, wherein at least one selected from the group consisting of the positive electrode, the negative electrode, and the electrolyte layer includes the solid electrolyte particle according to claim 1.

12. A method of manufacturing a solid electrolyte material, the method comprising
firing a mixed material in an inert gas atmosphere, the mixed material including a halide including Li, a halide including Y, a halide including Sm, and a halide including DC, wherein
the DC is at least one selected from the group consisting of Mg, Ca, Sr, and Ba,
the solid electrolyte material is a solid electrolyte particle consisting of Li, DC, Y, Sm and X or made of a compound including Li, DC, Y, Sm and X as a main component,
wherein
the DC is at least one selected from the group consisting of Mg, Ca, Sr, Ba, and Zn,
the X is at least one selected from the group consisting of Br and Cl,
when the solid electrolyte particle is made of the compound including Li, DC, Y, Sm and X as a main component, a largest amount component of the particle in molar ratio is the compound,
a median diameter of the solid electrolyte particles is 0.5 μm or more and 10 μm or less, and
the solid electrolyte particle is represented by the following composition formula (1), $$Li_{3-2a-3d}DC_aY_{1-b}Sm_{b+d}Br_{6-c}Cl_c \qquad (1)$$

where the following four mathematical relations are satisfied:
$0 < a \leq 0.25$;
$0 < b < 1$;
$0 \leq c \leq 6$; and
$0 \leq d \leq 0.05$.

13. The method according to claim 12, wherein
in the firing, the mixed material is fired at $200°$ C. or more and $650°$ C. or less.

14. The method according to claim 12, wherein
the mixed material is a material in which Liα, Yβ₃, Smγ₃, and DCδ₂ are mixed and
the α, the β, the γ, and the δ are each independently at least one selected from the group consisting of Br and Cl.

\* \* \* \* \*